United States Patent [19]

Coiner, Jr.

[11] Patent Number: 5,061,436

[45] Date of Patent: Oct. 29, 1991

[54] GAS COOLED NUCLEAR FUEL ELEMENT

[75] Inventor: John R. Coiner, Jr., Lynchburg, Va.

[73] Assignee: The Babcock & Wilcox Company, New Orleans, La.

[21] Appl. No.: 457,033

[22] Filed: Dec. 22, 1989

[51] Int. Cl.$^5$ .............................................. G21C 3/30
[52] U.S. Cl. .................................... 376/431; 376/430; 376/451
[58] Field of Search .......................... 376/431, 430, 451

[56] References Cited

U.S. PATENT DOCUMENTS

| 3,222,773 | 12/1965 | Zambrow | 376/431 |
|---|---|---|---|
| 3,291,696 | 12/1966 | Sugimoto | 376/430 |
| 3,422,523 | 1/1969 | Kling | 376/431 |
| 3,928,132 | 12/1975 | Bujas | 376/431 |
| 4,759,911 | 7/1988 | Bingham | 376/428 |

Primary Examiner—Donald P. Walsh
Attorney, Agent, or Firm—R. J. Edwards; D. Neil LaHaye

[57] ABSTRACT

A gas cooled nuclear fuel element having a particle fuel retention device which acts as a passive restraint in the event of failure of hot frit. A particle fuel retention device is positioned either in the annular space within the inner frit, in the end cap through which coolant gas flows, or attached to the end cap and extending axially beyond the fuel element.

13 Claims, 2 Drawing Sheets

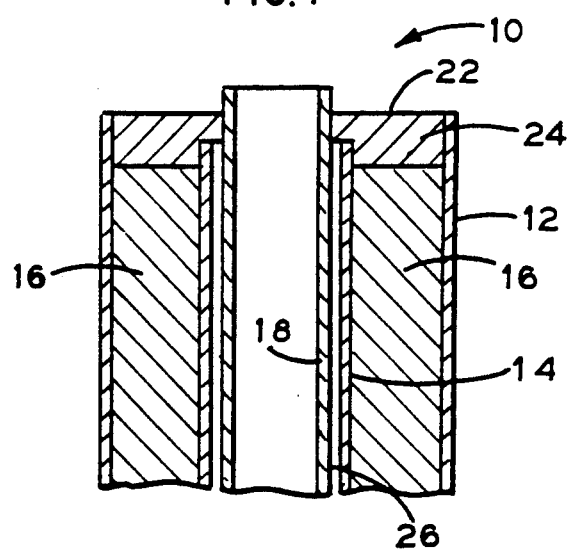
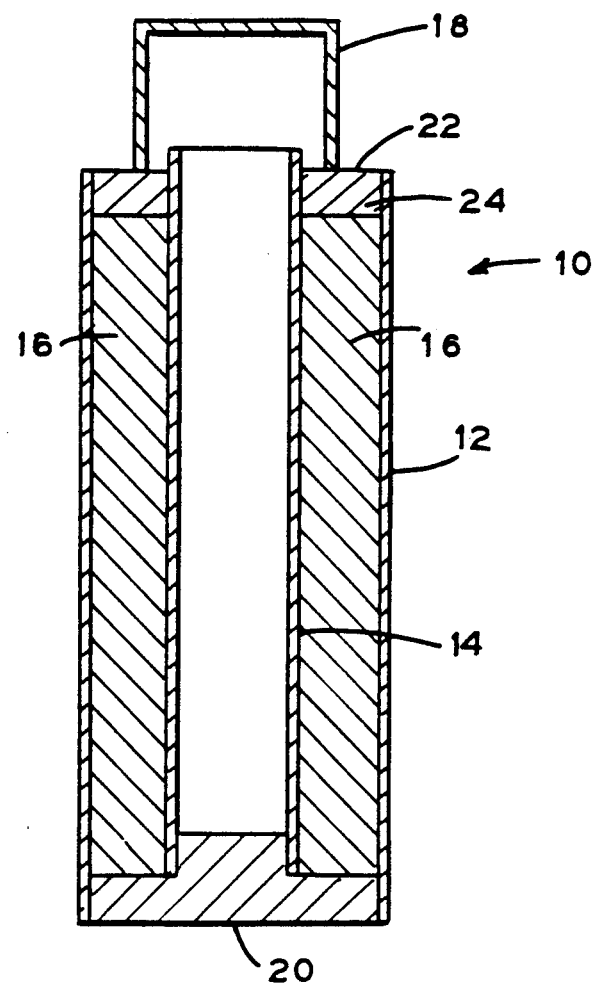

GAS COOLED NUCLEAR FUEL ELEMENT

BACKGROUND OF THE INVENTION

1. Field of the Invention

The present invention is related to nuclear fuel elements and in particular to gas cooled nuclear fuel elements.

2. General Background

Gas-cooled particle bed reactors (PBR's) are cooled by a gas flowing radially inward through the annular particle fuel bed. These reactors use fuel elements formed from particle fuel wherein the fuel particle bed is confined in the annular space between an outer porous cylinder and an inner porous cylinder. The coolant gas flows out of an axial channel defined by the inner porous cylinder. A major concern regarding these types of fuel elements is related to the potential for a failure of the inner porous cylinder (hot frit) to release fuel particles to the reactor exit gas stream. In a closed Brayton cycle, a failure would allow the fuel particles to impinge on the turbine and compressor blades with resulting damage. In an open cycle system, a failure also provides a path for release of the particles to the surrounding environment. A variety of fuel elements and fuel particles are known in the art.

U.S. Pat. No. 3,992,258 discloses coated nuclear fuel particles of low density to accommodate fission gases generated during the use of the fuel particles.

U.S. Pat. No. 3,928,132 discloses a compacted fuel element of annular shape enclosed in a graphite casing constituted by an inner and outer tube. The outer tube is larger than the inner tube and also has a greater coefficient of shrinkage.

U.S. Pat. No. 3,361,638 discloses a nuclear fuel particle having a central core of fissile or fertile material surrounded by a fission-product retentive layer of true pyrolytic graphite.

U.S. Pat. No. 3,311,540 discloses a direct cycle integral vapor generating and superheating reactor having, within each pressure tube, a plurality of concentric annular fuel elements clad in metal such as stainless steel. The coolant passes alternately downwardly and upwardly among the fuel elements from the outer flow passage to the inner flow passage.

U.S. Pat. No. 3,222,773 discloses a process of assembly for arranging cladded tubular and cylindrical nuclear fuel members within each other.

U.S. Pat. No. 3,345,733 discloses a method of constructing a nuclear fuel element of a plurality of part annular plates supported at their longitudinal edges by radial support members to define a series of spaced coaxial tubes.

U.S. Pat. No. 4,759,911 discloses the use of a plurality of progressively sized rigid porous cylinders nested together in coaxial alignment with varying quantities of nuclear fuel distributed on each cylinder.

U.S. Pat. No. 3,074,873 discloses a solid nuclear fuel element comprising a plurality of concentric circular cylinders.

U.S. Pat. No. 3,291,696 discloses a fuel element having a fuel layer sandwiched between a gas-impermeable core member and covering layer, and a cylindrical filler member coaxial with the core member and spaced from the covering layer to define a gap therebetween for the circulation of a purge gas to remove gaseous fission products. Gaseous coolant contacts only the external surface of the core member.

U.S. Pat. No. 3,926,720 discloses a block of moderating material having an array of parallel holes with fissile plutonium in each hole and coolant channels for heat removal.

U.S. Pat. No. 4,022,663 discloses pressed spherical fuel elements made of graphite for high temperature reactors.

U.S. Pat. No. 4,678,629 discloses an annular fuel pellet formed from an annular outer pellet and a cylindrical inner pellet.

U.S. Pat. Nos. 2,985,576; 3,138,534; 3,422,523; and 3,753,854 disclose a variety of fuel elements and are representative of the known art.

As the known art does not address the aforementioned problem, there exists a need for a gas cooled nuclear fuel element which significantly reduces the possibility of the release of fuel particles from the fuel element.

SUMMARY OF THE INVENTION

The present invention solves the aforementioned problem in a straightforward manner. What is provided is a gas cooled nuclear fuel element having a particle fuel retention device which acts as a passive restraint in the event of failure of the hot frit. An outer porous frit is attached at each end to an inner porous frit which is concentric therewith. A particle fuel bed is contained in the annular space defined between the two frits. Coolant gas flows radially through the outer frit, fuel bed, and inner frit and then longitudinally out one end of the inner frit. A device for retention of fuel particles is positioned inside the inner frit or at the end of the fuel element where the coolant gas exits the fuel element. A combination of both may also be used.

BRIEF DESCRIPTION OF THE DRAWINGS

For a further understanding of the nature and objects of the present invention reference should be had to the following description, taken in conjunction with the accompanying drawings, in which like parts are given like reference numerals and, wherein:

FIG. 7 is a view of another alternate embodiment of the invention.

FIG. 8 is a sectional view of the invention.

DETAILED DESCRIPTION OF THE PREFERRED EMBODIMENT

Figure 1:
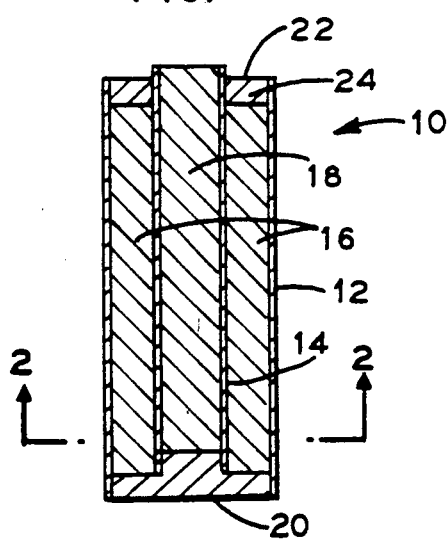
FIG. 1 is a sectional view of an alternate embodiment of the invention.

Referring to the drawings, it is seen in FIG. 8 that the invention is generally referred to by the numeral 10. Gas cooled nuclear fuel element 10 is generally comprised of outer cylinder or frit 12, inner cylinder or frit 14, fuel particle bed 16, and particle fuel retention means 18.

Outer frit 12, also commonly referred to in the industry as the cold frit, is formed from a rigid porous material which may be metallic or nonmetallic and manufactured by a variety of techniques. One technique is pressing a powder into a porous cylinder and then partially sintering the cylinder a high temperature and low pressure. Another is to cross wind several layers of wire on a mandrel to obtain the desired pore size. The winding is then partially sintered to produce a rigid structure with the strength of the parent metal. Another technique is to fabricate a solid non-porous cylinder of the proper thickness and then drill holes through the wall. In any method, the pores in both frits must be smaller than the fuel particles.

Inner frit 14, also known as the hot frit, is formed from a rigid porous material in the same manner as outer frit 12. Inner frit 14 is attached to outer frit 12 at one end and is concentric therewith, defining an annulus between the two frits and a cylindrical space interior of inner frit 14.

The annulus between outer and inner frits 12, 14 is occupied by fuel particle bed 16 which is formed from a plurality of spherical particles of any suitable nuclear fuel. Spherical pebbles or grains of nuclear fuel formed by a process known in the art are individually coated with a gas-impervious material so that each particle or pebble retains its own fission product gases to avoid contamination of the gas coolant. The fuel bed is thus made up of a large number of small individual particles or pebbles.

Figure 3:
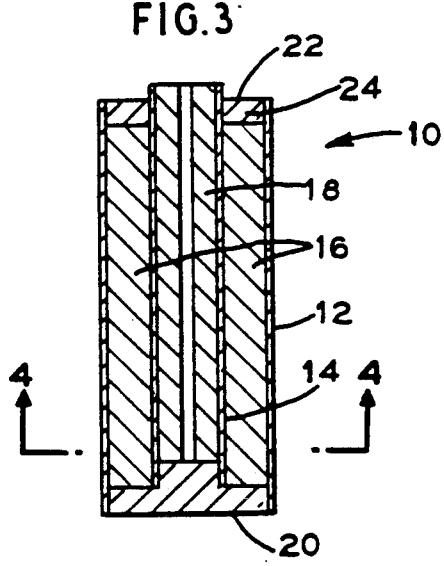
FIG. 3 is a sectional view of an alternate embodiment of the invention.
Figure 5:
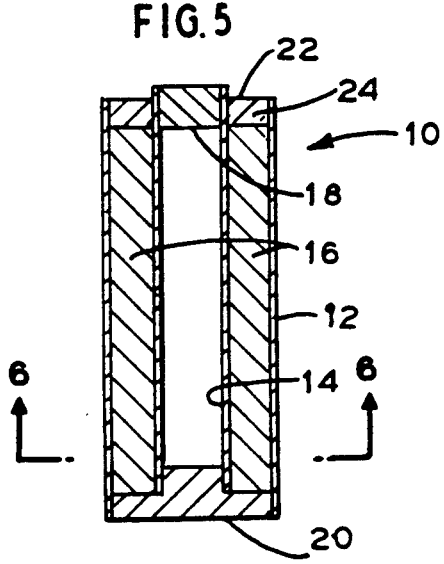
FIG. 5 is a sectional view of another alternate embodiment of the invention.

In FIG. 1, 3 and 7, fuel particle retention means 18 is positioned in the annular space interior of inner frit 14 and extends to the end of fuel element 10. In FIG. 5 and 8, fuel particle retention means 18 is positioned at the end of fuel element 10.

As seen in FIG. 1-8, inner and outer frits 14, 12 are attached to each other at one end leaving inner frit 12 free to expand axially. At one end, frits 12, 14 are connected together by first end cap 20 which is nonporous and prevents the flow of coolant gas out this end. At the other end, frits 12, 14 are aligned by second end cap 22 which is provided with a central bore therethrough in coaxial alignment with the interior of inner frit 14. This allows axial flow of coolant gas out from the cylindrical space interior of inner frit 14. Inner frit 14 is free to expand axially.

Figure 2:
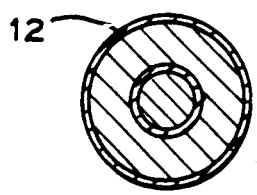
FIG. 2 is a view taken along the lines 2—2 of FIG. 1.

In the alternate embodiment of FIG. 1, second end cap 22 allows axial flow of coolant gas out of fuel element 10 through fuel particle retention means 18. Retention means 18 may be formed from any suitable material such as a highly porous foam material which is stable to the coolant gas and able to withstand the temperatures of the coolant gas as it exits the fuel element. Such materials include reticulated vitreous carbon and highly porous silicon carbide compounds. These materials may also be overcoated if necessary. The embodiment of FIG. 1 has the advantage that it does not require changes to currently proposed fuel core geometries. Very low additional core pressure drop should also be obtainable. As seen in FIG. 1 and 2, particle fuel retention means 18 occupies the entire annular space interior of inner frit 14.

Figure 4:
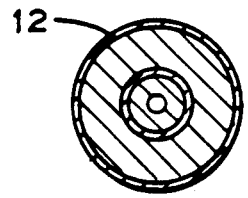
FIG. 4 is a view taken along the lines 4—4 of FIG. 3.

In the embodiment illustrated in FIG. 3 and 4, particle fuel retention means 18 occupies the entire length of the annular space interior of inner frit 14 but not its entire volume. This embodiment provides advantages similar to those in the embodiment of FIG. 1.

Figure 6:
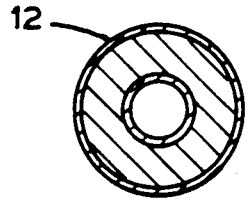
FIG. 6 is a view taken along the lines 6—6 of FIG. 5.

In the embodiment of FIG. 5, 6 and 8, particle fuel retention means 18 is attached to second end cap 22. In FIG. 5, retention means 18 may be formed from a porous foam material, as described above, and is positioned in the space in second end cap 22 in coaxial alignment with the interior of inner frit 14. The cross section of FIG. 6 illustrates that the annular space interior of inner frit 14 is left unoccupied. In the preferred embodiment of FIG. 8, retention means 18 is attached to second end cap 22, is substantially U-shaped, and extends axially beyond fuel element 10. This is essentially a double-frit configuration but provides the advantage of not introducing additional poison material into the core. In this embodiment, retention means 18 may be formed from a screen which may have the same diameter as inner frit 14, be an extension thereof, or even be a separate frit of the same or different material. Porous foam material may also be included in second end cap 22 to aid coolant gas flow.

FIG. 7 illustrates an embodiment wherein particle fuel retention means 18 is positioned in the annular space interior of inner frit 14 and is formed from a second inner or hot frit 26. This is essentially a double frit configuration with the second frit being spaced a preset distance from the true hot frit. While inner frit 14 is in radial compression, second inner frit 26 need only withstand the pressure from the radial flow of coolant gas. This should provide a high degree of confidence that all fuel particles will be retained in the fuel element area. Any increase in the coolant pressure drop should also be negligible.

In operation, coolant gas flows radially inward to fuel element 10 through outer frit 12, particle fuel bed 16, and inner frit 14. The heated gas then flows axially out fuel element 10 through second end cap 22. Particle fuel retention means 18 allows gas flow but prevents the release of fuel particles in the event of failure of inner frit 14.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A gas cooled nuclear fuel element, comprising:
   a. a porous outer cylinder;
   b. a porous inner cylinder connected at one end to and concentric with said outer cylinder, defining an annulus between said cylinders and a cylindrical space interior of said inner cylinder;
   c. a fuel particle bed in said annulus between said inner and outer cylinders; and
   d. fuel particle retention means positioned in the cylindrical space interior of said inner cylinder.

2. The fuel element of claim 1, wherein said retention means comprises a porous foam material.

3. The fuel element of claim 2, wherein said porous foam material is formed from reticulated vitreous carbon.

4. The fuel element of claim 2, wherein said porous foam material is formed from a silicon carbide compound.

5. The fuel element of claim 1, wherein said inner and outer cylinders are attached to each other by an end cap at one end and aligned at the other end, thereby allowing the flow of coolant gas therethrough.

6. The fuel element of claim 1, wherein said retention means occupies the entire cylindrical space interior of said inner cylinder.

7. The fuel element of claim 1, wherein said retention means occupies the entire length of the cylindrical space interior of said inner cylinder but not the entire volume.

8. A gas cooled nuclear fuel element, comprising:
   a. a porous outer cylinder;
   b. a porous inner cylinder concentric with said outer cylinder, defining an annulus between said cylinders and a cylindrical space interior of said inner cylinder;
   c. said outer and inner cylinders being connected to each other by a first end cap at one end and aligned by a second end cap at the other end;
   d. a fuel particle bed in said annulus between said inner and outer cylinders; and
   e. fuel particle retention means attached to one of said end caps.

9. The fuel element of claim 8, wherein said retention means is positioned in one of said end caps so as to be coaxial with the interior of said inner cylinder.

10. The fuel element of claim 9, wherein said retention means is formed from a porous foam material.

11. The fuel element of claim 8, wherein said retention means extends axially from said fuel element.

12. A gas cooled nuclear fuel element, comprising:
   a. a porous outer cylinder;
   b. a porous inner cylinder concentric with said outer cylinder, defining an annulus between said cylinders and a cylindrical space interior of said inner cylinder;
   c. said outer and inner cylinders being connected to each other at one end by a nonporous first end cap and aligned at the opposite end by a second end cap having a central bore therethrough;
   d. a fuel particle bed formed from a plurality of individual spherical nuclear fuel particles in said annulus between said cylinders; and
   e. fuel particle retention means attached to and extending axially from said second end cap.

13. The fuel element of claim 12, wherein said retention means is formed from a screen.

* * * * *